(12) United States Patent
Maki et al.

(10) Patent No.: US 9,644,568 B2
(45) Date of Patent: May 9, 2017

(54) REINFORCED COMPOSITE CYLINDER BLOCK

(71) Applicant: Ford Global Technologies, LLC, Dearborn, MI (US)

(72) Inventors: Clifford E. Maki, New Hudson, MI (US); Larry Dean Elie, Ypsilanti, MI (US); Kevin Durand Byrd, Novi, MI (US); Rick L. Williams, Canton, MI (US); Wolfram Buschhaus, Ann Arbor, MI (US); Matthew John Zaluzec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/610,159

(22) Filed: Jan. 30, 2015

(65) Prior Publication Data
US 2016/0222914 A1 Aug. 4, 2016

(51) Int. Cl.
| | | |
|---|---|---|
| *F02F 7/00* | (2006.01) |
| *B29C 70/02* | (2006.01) |
| *B29K 705/08* | (2006.01) |
| *B29L 31/00* | (2006.01) |
| *B29K 105/20* | (2006.01) |
| *B29K 105/12* | (2006.01) |

(52) U.S. Cl.
CPC ......... *F02F 7/0095* (2013.01); *B29C 70/023* (2013.01); *F02F 7/0021* (2013.01); *F02F 7/0085* (2013.01); *B29K 2105/12* (2013.01); *B29K 2105/20* (2013.01); *B29K 2705/08* (2013.01); *B29L 2031/749* (2013.01); *F05C 2201/0412* (2013.01); *F05C 2225/00* (2013.01)

(58) Field of Classification Search
CPC .......... F02F 7/00; F02F 7/0073; F02F 7/0085; F02F 7/0021; B22D 19/0009
USPC .................. 123/195 R, 195 A, 195 S, 195 H
See application file for complete search history.

(56) References Cited

U.S. PATENT DOCUMENTS

| | | |
|---|---|---|
| 4,430,969 A | 2/1984 | Holtzberg et al. |
| 4,433,652 A | 2/1984 | Holtzberg et al. |
| (Continued) | | |

FOREIGN PATENT DOCUMENTS

| | | |
|---|---|---|
| DE | 102004001908 A1 | 8/2005 |
| FR | 2921117 A3 | 3/2009 |

OTHER PUBLICATIONS

Saito, T. "A Cost-Effective P/M Titanium Matrix Composite for Automobile Use," Kluwer Academic Publishers, Boston, MA., 1995, 24 pages.

(Continued)

*Primary Examiner* — Long T Tran
(74) *Attorney, Agent, or Firm* — Damian Porcari; McCoy Russell LLP

(57) ABSTRACT

Systems and methods are provided for forming an engine comprising a thermoset composite engine block. One example method includes reinforcing the engine block with a plurality of metal strips, wherein a first portion of the plurality of metal strips are positioned in a substantially transverse direction of the engine block and a second portion of the plurality of metal strips are positioned in a substantially longitudinal direction of the engine block. The plurality of metal reinforcing strips may provide additional reinforcement to the engine block.

18 Claims, 3 Drawing Sheets

(56) References Cited

U.S. PATENT DOCUMENTS

| | | | |
|---|---|---|---|
| 4,644,911 A * | 2/1987 | Hidaka | F02B 75/20 123/184.61 |
| 4,793,299 A * | 12/1988 | Ishimura | F16M 1/02 123/195 A |
| 4,848,292 A | 7/1989 | Holtzberg | |
| 4,852,531 A | 8/1989 | Abkowitz et al. | |
| 4,868,038 A | 9/1989 | McCullough, Jr. et al. | |
| 5,045,407 A | 9/1991 | Ritter | |
| 5,083,537 A * | 1/1992 | Onofrio | F02F 1/108 123/195 C |
| 5,463,989 A | 11/1995 | Saaf et al. | |
| 6,009,843 A | 1/2000 | Griffin et al. | |
| 6,238,617 B1 | 5/2001 | Strasser et al. | |
| 6,928,974 B1 * | 8/2005 | Markou | F01M 11/0004 123/195 H |
| 8,161,951 B2 * | 4/2012 | Mochida | F01M 13/02 123/195 C |
| 2009/0101124 A1 * | 4/2009 | Mochida | F01M 13/04 123/572 |
| 2014/0157954 A1 | 6/2014 | Zettergren | |

OTHER PUBLICATIONS

Pickens J., "Low-cost Titanium for Ships and Tanks," Concurrent Technology Corporation, Johnstown, PA., May 2004, 3 pages.

Buckley, R. et al., "Design Process for Resin Transfer Molded, Fiber Reinforced Poppet Valves for Internal Combustion Engines," ASME Technical Paper Series No. 2006-1319, Proceedings of ICES2006, May 8-10, 2006, Aachen, Germany, 14 pages.

Black, S. "Composite Engine Valves" High Performance Composites, Jul. 2009, 4 pages.

"JEC Composites Show 2010 Highlights", High Performance Composites, May 2010, 4 pages.

Clark, S. "Engineers Recommend Changes to Orion Heat Shield," Spaceflight Now, Nov. 5, 2014, 9 pages.

Kyle-Henney, "Recent advances in Titanium Matrix Composite Technology in the UK," TISICS Limited, Farnborough Hampshire, no date, 10 pages.

* cited by examiner

REINFORCED COMPOSITE CYLINDER BLOCK

FIELD

The present disclosure relates to an engine having a thermo-molded composite cylinder block with additional reinforcement strips integrated into the cylinder block.

BACKGROUND AND SUMMARY

In engine design there may be trade-offs between strength, weight, and other properties of materials used to construct the cylinder head and block. For example, cast iron has been used to manufacture cylinder blocks. Cast iron may have several benefits over other materials, such as a smaller volume to strength ratio and a smaller friction coefficient, decreasing the engine's size and increasing combustion chamber longevity. However, cast iron cylinder blocks may have a low strength to weight ratio, may be more susceptible to corrosion, and may have undesirable heat transfer characteristics. In order to reduce block weight and increase the amount of heat transferred to water jackets, cylinder blocks may be cast out of aluminum.

A reduction in block weight may also be obtained by using an engine block made from a fiber-reinforced phenolic resin as shown by Holtzberg in U.S. Pat. No. 4,848,292. In this example, the phenolic resin, as a matrix, is reinforced by fiberglass or graphite fibers. The engine block may be produced either by injection molding or compression molding.

The inventors herein have identified potential issues with the approach of Holtzberg. For example, injection molding of fiber reinforced composite material to form engine blocks may result in non-uniform distribution of the reinforcing fibers. As an example, the reinforcing fibers may be unevenly distributed along critical load pathways of the engine block. In another example, the composite material by itself may not possess desired mechanical properties particularly along pathways encountering dynamic loads, structural loads, thermal loads, and loads from attachment to external devices.

The inventors herein have recognized the above issues and developed an approach to at least partly address the above issues. In one example approach, a method for molding an engine block is provided, comprising reinforcing the engine block with a plurality of metal strips, wherein a first portion of the plurality of metal strips are positioned in a substantially transverse direction of the engine block and a second portion of the plurality of metal strips are positioned in a substantially longitudinal direction of the engine block. In this way, additional reinforcement may be provided along specific pathways that may experience higher loads while simultaneously reducing engine weight.

For example, an engine block may be formed from a thermoset composite material via a molding process such as injection molding. In one example, the composite material may include a thermoset polymer matrix reinforced by glass, carbon, and/or aramid fibers. Prior to commencing the molding process, a plurality of additional metal reinforcement strips may be positioned in predetermined locations within a mold of the engine block. The strips may be manufactured from metals such as titanium, titanium alloys, or similar materials that possess a higher specific strength. Further, the predetermined locations may be in substantially longitudinal directions along the engine block and/or in substantially transverse directions of the engine block. In addition, reinforcement strips may be located along a substantially vertical direction of the engine block. As an example, the predetermined locations may include pan rails in a longitudinal direction of the engine block, a head deck in a transverse direction of the engine block, head bolt columns in a vertical direction of the engine block, and other similar regions that may experience higher loads. During injection molding, the composite material may fill spaces around the reinforcing strips and encapsulate the reinforcing strips within the formed structure of the engine block. The reinforcing strips may, thus, be integrally molded into the cylinder block at desired locations. As such, the reinforcement strips may be distinct from the reinforcing fibers distributed within the thermoset polymer matrix. It will also be noted that the reinforcing strips may be formed from a different material than the composite material used for the engine block.

In this way, a cylinder block of a lightweight composite material may be further reinforced to provide desired mechanical properties. Reinforcing strips may be positioned along paths within a mold for the cylinder block that may be exposed to substantial dynamic loads, thermal loads, or structural loads. Thus, specific locations within the cylinder block may be strengthened for improved performance and structural stability. By incorporating additional reinforcements where desired, adverse effects of non-uniform distributions of the fiber fill in the polymer matrix during molding may be reduced. Overall, structural properties of the cylinder block may be improved while maintaining a lower engine block weight.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
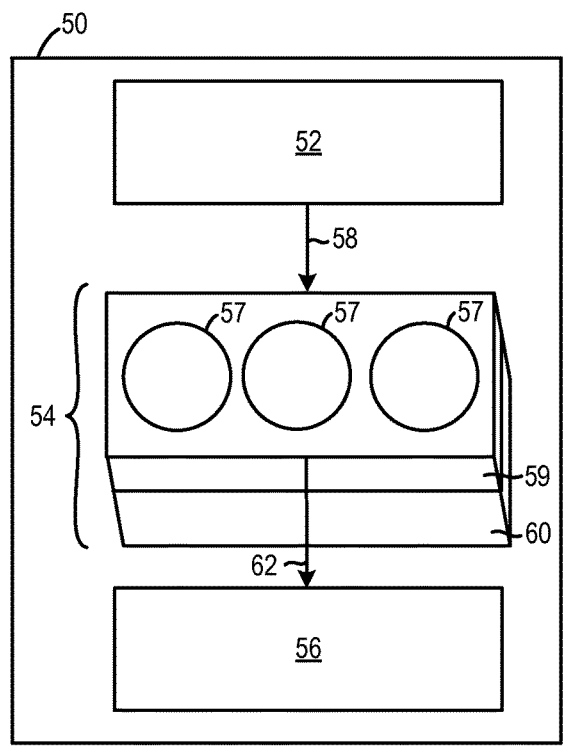
FIG. 1 shows a schematic depiction of a vehicle having an engine including a molded composite cylinder block with additional reinforcing strips.
Figure 2:
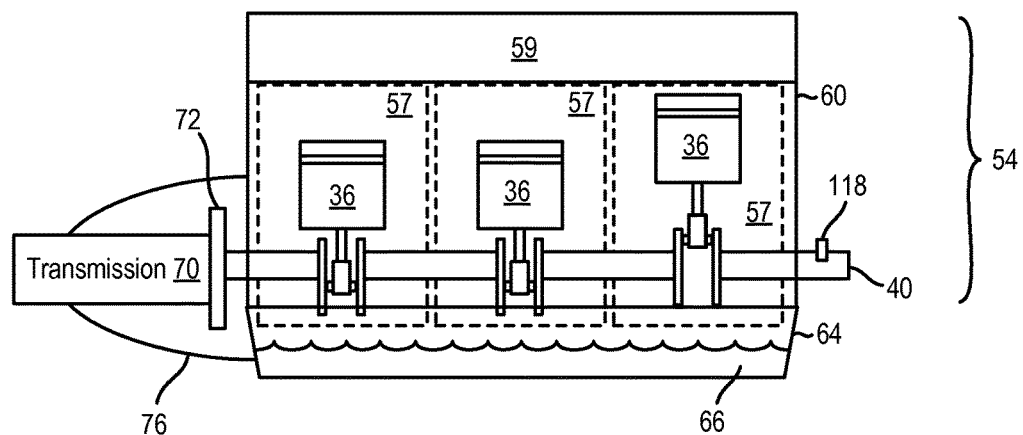
FIG. 2 shows a schematic depiction of the engine of FIG. 1.
Figure 3:
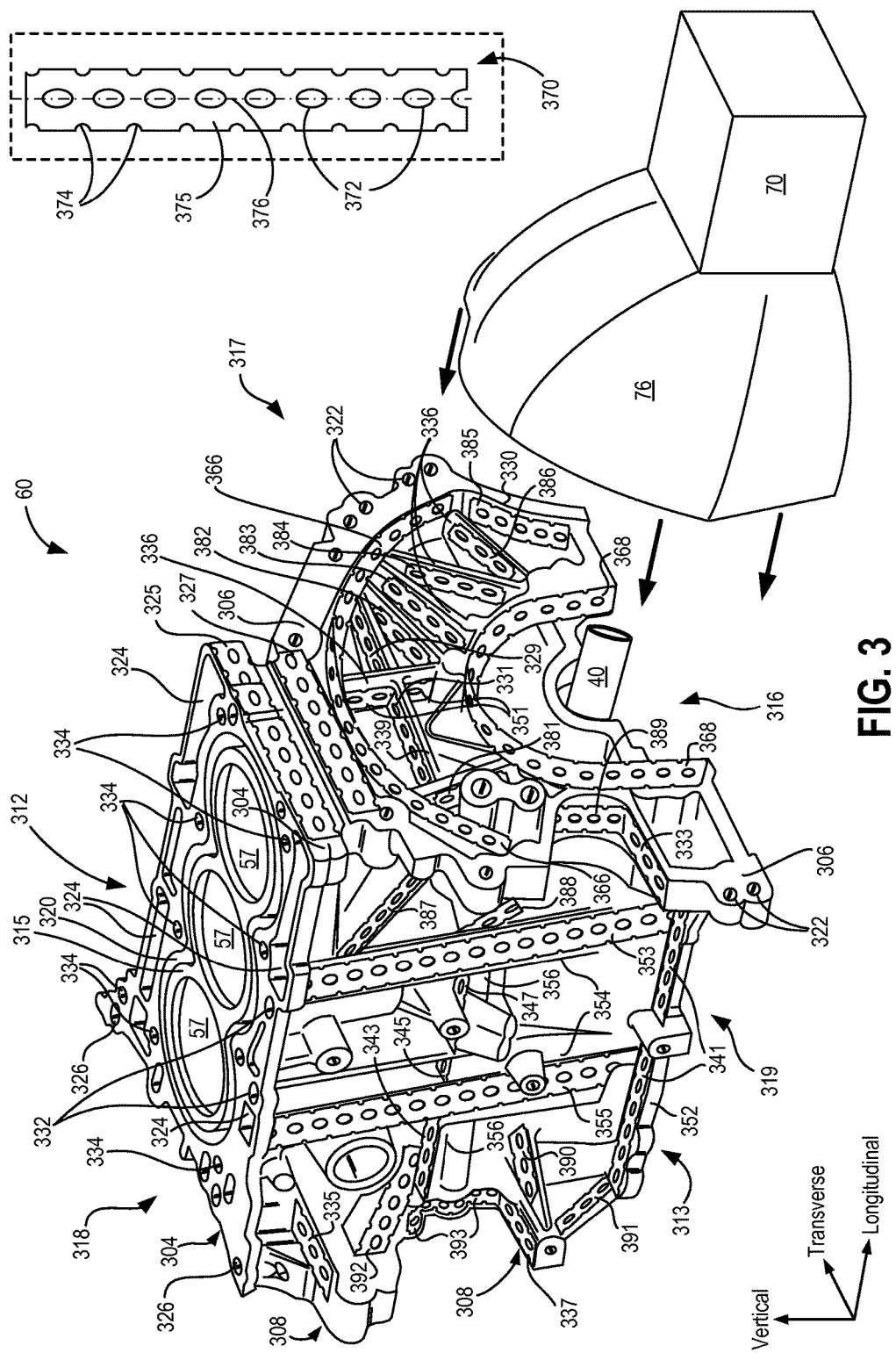
FIG. 3 shows a perspective view of the molded composite cylinder block with additional reinforcing strips in accordance with the present disclosure.

The following detailed description relates to forming an engine block of an engine in a vehicle, such as the engine depicted in FIG. 2 included in the vehicle of FIG. 1. The engine block may be manufactured from a thermoset composite material with metal reinforcing strips included at specific locations (FIG. 3). The thermoset composite material may include a matrix comprising a thermoset polymer with fibers used for matrix reinforcement. The metal reinforcing strips may be positioned along different directions of the engine block including longitudinal, transverse, vertical directions. As such, the specific locations for positioning the reinforcing strips may include pathways in the engine block that experience higher critical loads. The reinforcing strips may be positioned at desired locations within a mold of the engine block prior to injecting the thermoset composite material. Upon injecting the thermoset composite material, the strips may be encapsulated by the thermoset composite material within the mold and eventually, within the molded engine block. A method for forming the engine block according to the present disclosure is described in reference to FIG. 4. In this way, the engine block may be reinforced at desired locations by additional reinforcements that possess a higher specific strength enabling a reduction in engine block weight while providing suitable mechanical properties.

FIG. 1 shows a schematic depiction of a vehicle 50 including an intake system 52, an engine 54, and an exhaust system 56. The intake system 52 is configured to provide intake air to cylinders 57 in the engine 54. The cylinders may also be referred to as combustion chambers. Arrow 58 denotes a fluidic communication between the intake system 52 and the engine 54. Specifically, the intake system 52 may be configured to provide intake air to each of the cylinders 57 in the engine 54. The intake system 52 may include various intake conduits, an intake manifold, a throttle, etc. Furthermore, a turbocharger including a compressor and a turbine may be included in the engine 54, in one example.

The engine 54 includes a cylinder head 59 coupled to a molded cylinder block assembly 60 forming the plurality of cylinders 57. The cylinder block assembly 60 may also be termed an engine block assembly 60 or simply, an engine block 60 or a cylinder block 60. In the depicted example, the engine includes three cylinders in an inline configuration. However, alternate cylinder arrangements and cylinder quantities have been contemplated. For instance, the cylinders may be arranged in banks in a V-type configuration, the cylinder may be arranged in a horizontally opposed configuration, etc. A multi-stroke combustion cycle may be implemented. For instance, four or two stroke combustion cycles have been contemplated. It will be appreciated that the engine 54 depicted in FIG. 1 has structural complexity that is not depicted in FIG. 1. Specifically, the molded cylinder block assembly 60 may include a plurality of components which may be constructed out of different materials. For instance, the molded cylinder block assembly 60 and therefore the engine 54 may include a composite cylinder block, a plurality of reinforcing strips incorporated within the composite cylinder block, and separate cylinder liners. The cylinder liners may define a portion of a boundary of each of the three cylinders. The reinforcing strips within the composite cylinder block will be described in further detail in reference to FIG. 3 below.

Arrow 62 depicts a fluidic communication between the engine 54 and the exhaust system 56. It will be appreciated that each of the cylinders 57 in the engine 54 may be in fluidic communication with the exhaust system 56. The exhaust system 56 may include a plurality of components such as an exhaust manifold, emission control devices (e.g., catalysts, filters, etc.), mufflers, etc.

FIG. 2 presents a schematic illustration of engine 54 as coupled to a transmission 70. The cylinder head 59 is depicted coupled to a top side (or head deck) of the engine block assembly 60. The engine block 60 includes pistons 36 reciprocating within cylinders 37. The depicted example comprises three pistons such that each cylinder 57 includes one piston 36 reciprocating within. Each piston 36 is shown coupled to crankshaft 40 so that reciprocating motion of the pistons is translated into rotational motion of the crankshaft. Crankshaft 40 may be coupled to at least one drive wheel of a vehicle via transmission 70. Further, a starter motor may be coupled to crankshaft 40 via a flywheel 72 to enable a starting operation of engine 54. The transmission 70, flywheel 72, and starter motor may be at least partially enclosed within a transmission bell housing 76. Crankshaft sensor 118 coupled to crankshaft 40 may be used as an engine speed sensor. For example, crankshaft sensor 118 may produce a predetermined number of equally spaced pulses for every revolution of the crankshaft from which engine speed (RPM) can be determined. An oil pan 64 containing lubricating oil 66 is shown coupled to a base of engine block 60. In one example, oil pan 64 may be mechanically coupled to engine block 60 along one or more pan rails (shown in FIG. 3) along a periphery of the base of the engine block.

Turning now to FIG. 3, it shows a perspective view of an example molded (e.g., thermally molded) cylinder block assembly, such as the cylinder block assembly 60 of FIGS. 1 and 2. Engine block 60 depicted in FIG. 3 is drawn to scale, although other relative dimensions may be used, if desired. As mentioned earlier, engine block 60 may be made of a composite material. Engine block 60 may also include a plurality of reinforcing strips positioned at specific locations within the composite material. Further still, engine block 60 may include cylinder liner 315 which defines a portion of the boundary of a plurality of cylinders 57. The cylinder liner may comprise a metal (e.g., powdered metal) such as iron (e.g., graphite iron), aluminum, etc. In an assembled configuration the cylinder liner 315 may be positioned in an opening 320 in the composite cylinder block 60. Furthermore, the cylinder liner 315 may be formed out of a single continuous piece of material, as in the depicted example. However other cylinder liner configurations have been contemplated.

A number of suitable manufacturing methods may be used to construct the composite cylinder block 60. For instance, the composite cylinder block may be constructed via a thermal setting technique such as injection molding. Therefore, the composite cylinder block 60 may be referred to as a thermally set or a thermoset composite cylinder block, in one example. Suitable materials used to construct the composite cylinder block may include a thermoset composite material including a polymeric material such as a thermoset resin as a matrix. Example thermoset polymers for matrices include epoxy, phenolic resins, silicones, etc. The polymeric matrix may be reinforced by a plurality of discontinuous fibers dispersed within the matrix. The fibers may be formed from materials of higher axial strength, higher stiffness, and lower reactivity among other properties. For example, the fibers may be carbon fibers, glass fibers, aramid fiber, etc. Alternate examples may include using continuous fibers for matrix reinforcement.

The composite material of the engine block may be thermally stable when exposed to heat generated from combustion operation. For instance, the composite material may be thermally stable when operating in a temperature range between 120° C. and 200° C., in one example. However, the composite material by itself may not have a desired strength for handling stresses and strains generated in the engine during operation. As an example, certain locations within the engine block may experience higher loading and stress during operation. Accordingly, additional reinforcement may be provided at these locations by incorporating multiple reinforcement strips within the thermoset composite material at these specific locations. The multiple reinforcement strips may be formed of metal, in one example. As an example, the reinforcement strips may be made of titanium. Titanium offers a high strength to weight ratio as well as low reactivity, and higher ductility. In another example, titanium alloys may be used to form the reinforcing strips. Additionally and alternatively, carbon fiber strips may also be used. As such, other materials with higher specific strengths may be contemplated as reinforcement strips.

It will be appreciated that the reinforcement strips made of metal, e.g. titanium or similar materials are distinct and separate from the plurality of reinforcing fibers dispersed in the thermoset polymer matrix. As such, the reinforcing titanium strips may be an additional method of reinforcing the thermoset engine block. Further, the reinforcing members (strips) are not discontinuous (or continuous) fibers but have a greater width than the fibers reinforcing the polymer matrix. Furthermore, the reinforcing strips may be made from a material (e.g. titanium) different from the material used for fiber fill matrix reinforcement (e.g. glass, aramid, etc.).

Inset 370 in FIG. 3 depicts an example reinforcement strip 375 designed as a ribbon strip with nominal thickness relative to width and length. The length and width of each of the strips may vary based on the location within the engine block where the strip may be placed. However, a given reinforcing strip may have a uniform width and thickness. In one example, the reinforcing strips may have a thickness of 5 mm. In another example, the strips may be 1 mm thick. Alternate thicknesses are possible.

As shown in inset 370, the reinforcing strip 375 may include a plurality of oval holes 372 distributed along a center line 376 of reinforcing strip 375. Holes of other shapes (such as circular, rectangular, square, etc.) may be used instead of the depicted oval holes. Further, the size (and number) of the holes may be chosen such that the strength of the reinforcing strip is not compromised. In addition to holes 372, the perimeter of the reinforcing strip 375 may be perforated with semi-circular cutouts 374. As such, holes 372 and cutouts 374 along the border of the reinforcing strip 375 may enable encapsulation by the thermoset composite material. In other words, the holes 372 along center line 376 and the cutouts 374 along each edge of reinforcing strip 375 may allow the thermally set composite (e.g. resin matrix material with fiber reinforcement) to at least partially envelop the reinforcing strips enabling improved bonding during the injection molding procedure for forming the composite engine block.

As explained earlier, while different materials for the reinforcing strips have been contemplated, the remaining description will include reinforcing strips made from titanium. Returning now to engine block 60 of FIG. 3, it will be noted that the engine block 60 may not be drawn to scale. Further, three axes depicting the three directions (e.g. longitudinal, transverse, and vertical) relative to the engine block 60 are shown for reference in the following description.

The composite cylinder block 60 includes a top side 312, a bottom side 313 (or bottom surface 313), a front side 318 (or front surface 318), a rear side 316 (or rear surface 316), a first (lateral) side surface 317, and a second (lateral) side surface 319. A transmission attachment interface 306 having attachment openings 322 is shown on the rear side 316 of engine block 60. The transmission attachment interface 306 may be coupled (e.g. mechanically) to transmission bell housing 76 via attachment openings 322. Further, crankshaft 40 may be coupled to transmission 70 via flywheel 72 (not shown in FIG. 3). Additionally, the front side 318 may include an attachment interface 308 to couple to a front engine cover (not shown).

Powertrain bending may be witnessed at the transmission to cylinder block interface and may require additional structural support. This structural support may be enabled by placing titanium (or other material) reinforcing strips 368 and 366 along different parts of the housing along the transmission attachment interface that couple to the transmission bell housing 76. As depicted in FIG. 3, reinforcing strips 366 and 368 are positioned in arches along curved surfaces of the transmission attachment interface 306. As shown, each of arched reinforcing strips 366 and 368 may be a single complete strip. In other examples, each of arched reinforcing strips 366 and 368 may be composed of shorter sections.

Powertrain bending forces may be at least partially countered by incorporating additional reinforcing strips along various ribs 336 of the transmission bell housing interface. As will be observed from FIG. 3, multiple ribs 336 may be positioned for support in the transmission attachment interface 306. In the depicted example, ribs 336 are shown arranged in radial directions relative to arched reinforcing strip 368 incorporated within a housing interface. Incorporating reinforcing strips may enable at least partial countering of static and dynamic loads along ribs 336 of transverse attachment interface 306.

To elaborate, reinforcing strips 381, 382, 383, 384, 351, and 386 may be included within ribs 336 as shown in FIG. 3. Further, reinforcing strip 385 may be included along additional rib 330 towards a lower portion of transmission attachment interface 306. Reinforcing strips 381, 382, 383, 384, 385, and 386 may be positioned along the ribs in a direction that is distinct from substantially vertical, substantially transverse (or horizontal), and substantially longitudinal (or lengthwise). However, reinforcing strip 351 may be placed in rib 336 in transmission attachment interface 306 in a substantially vertical direction of the engine block 60. As depicted in FIG. 3, reinforcing strip 351 may be a single, complete strip within rib 336. Substantially transverse reinforcing strips 331 and 329 may be incorporated along rib 339. Rib 339 may be arranged in a substantially longitudinal direction of engine block 60, and may not be in a radial direction relative to arched reinforcing strip 368. In other embodiments, a single, substantially transverse strip may be used in place of reinforcing strips 331 and 329. Further, instead of single, substantially vertical strip 351, two separate strips may be utilized as rib 339 intersects rib 336 in the depicted embodiment.

Additional support to the transmission attachment interface may be provided by integrating reinforcing strips 333 and 389 towards second side surface 319 of the transmission attachment interface 306. A substantially transverse reinforcing strip 327 may also be incorporated towards an upper portion of the transmission attachment interface 306, above arched reinforcing strip 366. As such, reinforcing strip 327 may be incorporated along a transverse surface of the transmission attachment interface 306, the transverse surface located towards an upper portion of the transmission attachment interface above arched reinforcing strip 366.

It will be appreciated that additional reinforcing strips, in addition to those depicted in FIG. 3, may be incorporated within engine block 60 without departing from the scope of the present disclosure. For example, reinforcing strips may be located along regions within the housing of crankshaft 40. As an example, one or more substantially longitudinal reinforcing strips may be positioned parallel to crankshaft 40 along an inner edge of the housing of the crankshaft within a crankcase. As another example, one or more substantially vertical strips may be arranged along first side surface 317 along regions that may experience higher stresses. As yet another example, one or more substantially longitudinal strips may reinforce rails along a bottom surface 313 of engine block 60, though not shown in FIG. 3. Likewise, reinforcing strips depicted in FIG. 3 may be omitted in other embodiments based on engine block designs and regions or pathways exposed to critical loading without departing from the scope of the present disclosure.

Continuing with engine block assembly 60 of FIG. 3, top side 312 of the depicted reinforced composite cylinder block, also termed head deck 312, includes openings for cylinder head attachment 334, openings for coolant passage 324, and cavities for oil passage 332. It will be noted that all openings may not be numbered. Openings for cylinder head attachment 334 may enable joining of cylinder head 59 to head deck 312 of engine block 60 via bolts or other suitable attachment apparatuses. Cavities for oil passage 332 may enable flow of oil returning from the cylinder head 59 towards the oil pan. Thus, cavities for oil passage 332 may be in fluidic communication with the cylinder head and the oil pan and these cavities may surround cylinders 57. Cylinders 57 may include cylinder liner 315 which allow separation of cylinders 37 from composite material forming cylinder block 60.

Similar to the cavities for oil passage, openings for coolant passage 324 may allow coolant to flow around the periphery of cylinders 57 for absorbing heat. As shown in FIG. 3, coolant passages 354 may stream coolant from openings for coolant passages 324 on head deck 312 towards bottom surface 313 of engine block 60. FIG. 3 depicts reinforcing strips 353 and 355 reinforcing coolant passages 354 on the second side surface 319 of engine block 60. Similar coolant passages may be included on first side surface 317 of engine block 60 and may be similarly reinforced by titanium strips. Reinforcing strips 353 and 355 may be arranged in a substantially vertical direction of the engine block 60.

Powertrain bending forces may affect the head deck 312 while combustion load paths may occur along head bolt columns and main bearing columns (of the crankshaft 40). These forces may be at least partially counteracted by placing reinforcing titanium strips along head deck 312 and along head bolt columns and main bearing columns (not shown). As depicted in FIG. 3, reinforcing strip 325 may be positioned along transverse edge 304 on rear side 316 of head deck 312. Reinforcing strip 325 along transverse edge 304 on rear side 316 of head deck 312 may extend from approximately first side surface 317 towards second side surface 319. A similar reinforcement strip may be incorporated on the transverse edge 304 of front side 318 (not shown).

In order to at least partially counter combustion loads along head bolt columns and main bearing columns which may be internally disposed within engine block 60, reinforcing strips may be positioned around these columns for additional stability and support.

Powertrain bending may also be witnessed along one or more pan rails 352 towards a base (or bottom side 313) of cylinder block assembly 60. As described earlier, oil pan 64 may be coupled to engine block 60 along a periphery of the base (or bottom surface 313) of cylinder block 60 via one or more pan rails 352. Stresses from the transmission 70 along pan rails 352 may be at least partially countered by incorporating reinforcing titanium strip 341 in the one or more pan rails 352. As such, reinforcing strip 341 may be positioned in a substantially longitudinal direction of engine block 60. Further, the reinforcing strip 341 may be a single, longitudinal strip incorporated within an entirety of each pan rail 352. In alternative embodiments based on engine design, reinforcing strip 341 may be composed of distinct and separate strips. Second side surface 319 also includes substantially longitudinal reinforcing strips 343, 345, and 347 arranged within oil gallery 356. Similar reinforcing strips may be included within other oil galleries in engine block 60, though not specifically depicted.

It will be appreciated that though FIG. 3 indicates longitudinal reinforcing strip 341 lying on top of pan rail 352, the reinforcing strip 341 may be encapsulated within pan rail 352 once engine block 60 is molded. The depiction of the reinforcing strips on top of different surfaces as shown in FIG. 3 is for visual clarity. Similarly, other reinforcing strips in FIG. 3 may be depicted as lying on a surface of ribs, rails, etc. but in actuality may be encapsulated integrally within the ribs, rails, structures, etc.

Structural support of the engine block 60 may be enhanced by incorporating reinforcing strips along multiple ribs and parts of a frame of the engine block as shown on second side surface 319. For example, reinforcing strips 390, 391, 337, 393, 392, and 335 may be included along various parts of the support structure of engine block 60.

It will be noted that the plurality of titanium strips distributed within cylinder block assembly 60 of FIG. 3 may include a first portion of the plurality of reinforcing strips positioned in a substantially transverse direction of the engine block 60, a second portion of the plurality of reinforcing strips positioned in a substantially longitudinal direction of the engine block 60, a third portion of the plurality of reinforcing strips positioned in a substantially vertical direction of the engine block 60, and a fourth portion of the plurality of reinforcing strips positioned in a substantially non-transverse, non-vertical, and non-longitudinal direction of the engine block 60. To elaborate, the first portion of the plurality of reinforcing strips may be arranged in a direction that is substantially parallel to a transverse direction of the engine block 60 but may not be in (or not be parallel to) a perfectly transverse direction of the engine block 60. For example, the first portion of the plurality of reinforcing strips may be arranged in a direction that is within 15° of the transverse direction of the engine block. Specifically, the first portion of the plurality of reinforcing strips may include reinforcing strips positioned at angles ranging from 0° to 15° relative to the transverse direction of the engine block, wherein 0° indicates precisely parallel to the transverse direction. It will be appreciated that a first quantity of the first portion of reinforcing strips may be positioned at about 5° relative to the transverse direction while a second quantity of the first portion of reinforcing strips may be arranged about 10° relative to the transverse direction. However, each of the first quantity and the second quantity of reinforcing strips will be considered as belonging to the first portion of the plurality of reinforcing strips.

In another example, the first portion of the plurality of reinforcing strips may include reinforcing strips positioned at an angle within 10° of the transverse direction of the engine block. In yet another example, the first portion of the plurality of reinforcing strips may be positioned precisely parallel to the transverse direction of the engine block.

Similarly, the second portion of the plurality of reinforcing strips may be placed in a substantially longitudinal direction of the engine block. In one example, the second portion of the plurality of reinforcing strips may be placed precisely in the longitudinal direction of the engine block. In another example, the positioning angle of the second portion of the plurality of reinforcing strips may be within 10° of the longitudinal direction of the engine block. It will be appreciated that a first quantity of the second portion of reinforcing strips may be positioned at about 6° relative to the longitudinal direction while a second quantity of the second portion of reinforcing strips may be arranged about 10° relative to the longitudinal direction. However, each of the first quantity and the second quantity of reinforcing strips will be considered as belonging to the second portion of the plurality of reinforcing strips.

Likewise, the third portion of the plurality of reinforcing strips may be placed in a substantially vertical direction of the engine block. As such, the third portion of the plurality of reinforcing strips may not be placed in a precisely vertical direction of the engine block. For example, the third portion of the plurality of reinforcing strips may include those reinforcing strips that are arranged at an angle of 20° relative to the vertical direction of the engine block.

In another example, reinforcing strips positioned at angles within 5° of the vertical direction of the engine block may be considered as belong to the third portion of the plurality of reinforcing strips. Herein, it will be appreciated that a first quantity of the third portion of reinforcing strips may be positioned at about 2° relative to the vertical direction while a second quantity of the third portion of reinforcing strips may be arranged about 4° relative to the vertical direction. However, each of the first quantity and the second quantity of reinforcing strips will be considered as belonging to the third portion of the plurality of reinforcing strips.

Alternatively, reinforcing strips that are parallel to the vertical direction may also be considered the third portion of the plurality of reinforcing strips.

Reinforcing strips that are positioned in a direction that is not substantially vertical, longitudinal, or transverse may be considered as belonging to the fourth portion of the plurality of reinforcing strips. For example, if the first portion of the plurality of reinforcing strips includes reinforcing strips placed at angles within 5° (as in, 0 to 5°) of the transverse direction of the engine block, and if the second portion of the plurality of reinforcing strips includes reinforcing strips placed at angles within 5° (as in, 0 to 5°) of the longitudinal direction of the engine block, and if the third portion of the plurality of reinforcing strips includes reinforcing strips placed at angles within 5° (as in, 0 to 5°) of the vertical direction of the engine block, the fourth portion of the plurality of reinforcing strips will include reinforcing strips placed at angles greater than 5° of each of the transverse direction, the longitudinal direction, and the vertical direction of the engine block. As such, reinforcing strips that are not considered as the first portion, or the second portion, or the third portion of the plurality of reinforcing strips may be included in the fourth portion of the plurality of reinforcing strips. Arched reinforcing strips 366 and 368 may also be included in the fourth portion of the plurality of reinforcing strips.

In the depicted example of FIG. 3, the first portion of the plurality of reinforcing titanium strips includes reinforcing strips 335, 337, 333, 325, 327, 329, and 331. As such, reinforcing strips 335, 337, 333, 325, 327, 329, and 331 are positioned in a substantially transverse direction or are substantially parallel to a transverse direction of engine block assembly 60. Likewise, the second portion of the plurality of reinforcing strips may include reinforcing strips 341, 343, 345, and 347. Thus, each of reinforcing strips 341, 343, 345, and 347 may be arranged in a direction that is substantially parallel to a longitudinal direction of cylinder block assembly 60. The third portion of the plurality of reinforcing strips may include reinforcing strips 355, 353, and 351, each of which is depicted in a substantially vertical direction or is substantially parallel to a vertical direction of the engine block 60. The fourth portion of the plurality of reinforcing strips may include reinforcing strips 392, 393, 390, 391, 387, 388, 389, 368, 366, 381, 382, 383, 384, 385, and 386 each of which is positioned in a direction distinct from any of substantially vertical, substantially longitudinal, and substantially transverse. Reinforcing strip 393 is depicted positioned in a curved manner though it includes certain sections that may be considered substantially vertical. Since the depicted example of FIG. 3 indicates reinforcing strip 393 as a single, undivided strip, it is included in the fourth portion of the plurality of the reinforcing titanium strips. Other embodiments may include this reinforcing strip as sections wherein each section may be included in a different portion of the plurality of reinforcing strips.

It will be noted that reinforcing strips other than those depicted in FIG. 3 may be included within these four portions of the plurality of reinforcing titanium strips. As such, FIG. 3 may not indicate all possible locations for including reinforcing titanium strips in the engine block 60.

It will also be appreciated that of the first portion of the plurality of reinforcing strips, a first number of reinforcing strips may substantially span the engine block along the transverse direction from first side surface 317 to second side surface 319. As an example, reinforcing strip 325 may substantially traverse a width of engine block 60 from first side surface 317 to second side surface 319 along transverse edge 304 of head deck 312. A similar reinforcing strip approximately spanning the width of engine block 60 from second side surface 319 until first side surface 317 may be positioned along a top edge of head deck 312 on front side 318. Thus, the first number of the first portion of the plurality of reinforcing strips includes reinforcing strip 325 in the depicted example of FIG. 3.

In the depicted example, other than reinforcing strip 325, reinforcing strips 335, 337, 333, 327, 329, and 331 of the first portion of the plurality of reinforcing strips may not entirely span the width of the engine block 60 from first side surface 317 until second side surface 319. For example, reinforcing strip 335 is a relatively shorter strip traversing a short rib on second side surface 319. Similarly, reinforcing strips 329 and 331 extend between two radial ribs 336 of the transmission attachment interface 306 and do not traverse the width of the engine block 60.

A second number of the second portion of the plurality of reinforcing strips may substantially span the engine block along the longitudinal direction from front surface 318 (also termed, front side 318) to rear surface 316 (also termed rear side 316) of engine block 60. For example, reinforcing strip 341 along pan rail 352 may be included in the second number of the second portion of the plurality of reinforcing strips. As observed in FIG. 3, reinforcing strip 341 extends from substantially front side 318 to rear side 316 in the pan rail 352. A similar reinforcing strip approximately spanning a length of engine block 60 from front side 318 until rear side 316 may be positioned along a pan rail on first side surface 317. Of the second portion of the plurality of reinforcing strips shown in FIG. 3, reinforcing strips 343, 345, and 347 may not span the longitudinal direction of the engine block but may be significantly shorter than the length of the engine block 60. As such, reinforcing strips 343, 345, and 347 may be shorter than reinforcing strip 341.

A third number of the third portion of the plurality of titanium reinforcing strips may substantially span the engine block along the vertical direction from bottom surface 313 to top side 312 (also termed, head deck 312) of engine block 60. As an example from FIG. 3, reinforcing strips 353 and 355 may be included in the third number of the third portion of the plurality of titanium reinforcing strips as these strips (353 and 355) extend substantially from head deck 312 to bottom side 313 traversing a considerable part of a height of the engine block 60.

It will be noted that though FIG. 3 depicts the reinforcing titanium strips laying on top of the ribs, pan rails, coolant draining columns, etc., the reinforcing strips may be accommodated within the ribs, pan rails, coolant draining columns, etc. As such, the thermoset composite material may encapsulate the titanium reinforcing strips within the engine block. The reinforcing strips are shown laying on top of the surfaces or locations to be reinforced for providing clarity of their locations within the engine block. Thus, arched reinforcing strips 366 and 368 may be encapsulated within a housing structure in the form of arches along transmission attachment interface 306.

Figure 4:
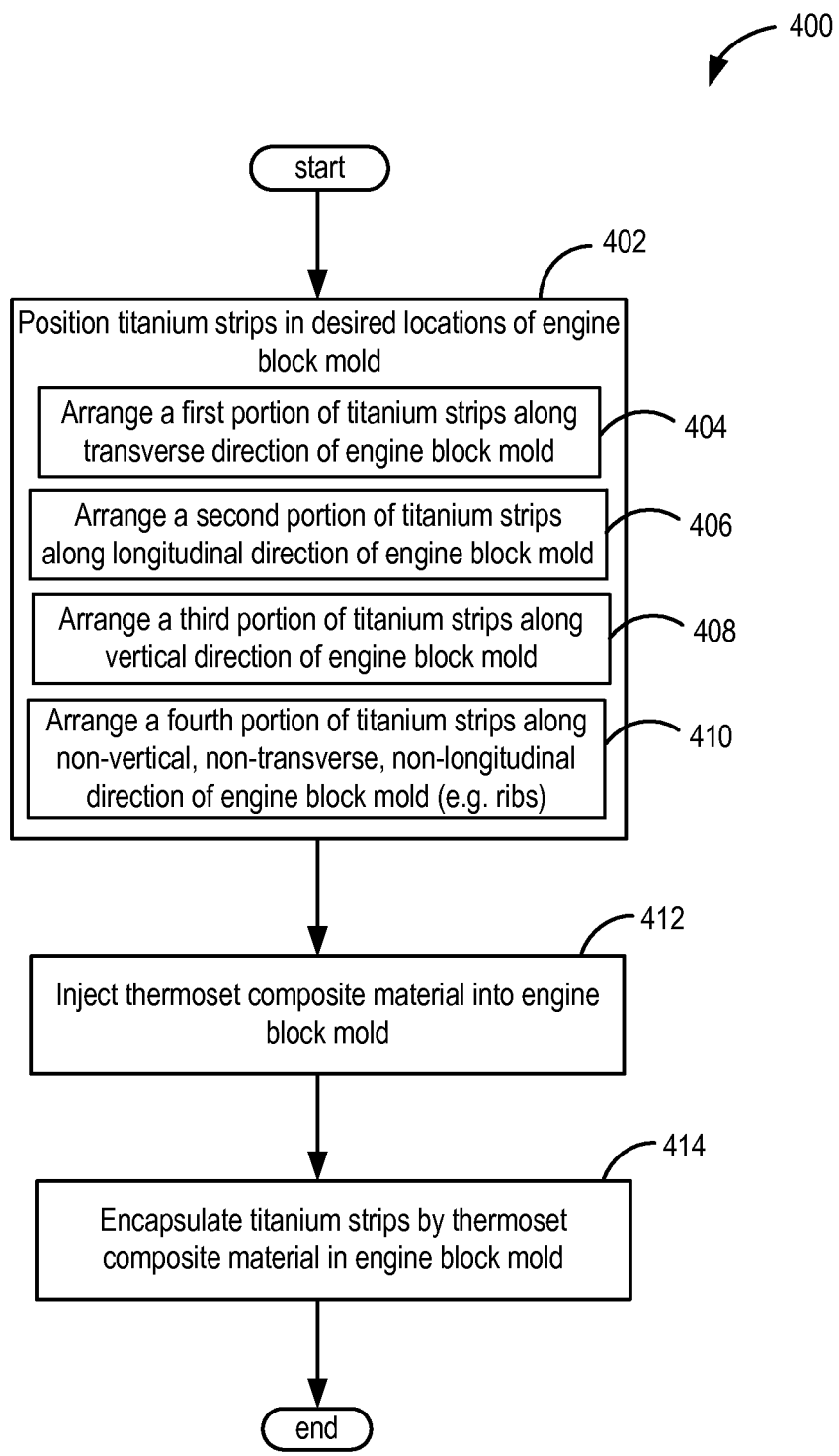
FIG. 4 shows a method for manufacturing the molded composite cylinder block of FIG. 3.

FIG. 4 shows a method 400 for manufacturing an engine according to the present disclosure. The method may be used to manufacture the engine block discussed above with regard to FIGS. 1-3 or may be used to manufacture another suitable engine. Specifically, the method includes arranging a plurality of metal reinforcing strips along predetermined locations of the framework of the engine block mold and molding the engine block by using a thermoset composite material. The reinforcing strips may be made of titanium. The thermoset composite material flows into the engine block mold and the reinforcing titanium strips are encapsulated within the thermoset composite material as the thermoset composite engine block cools and solidifies. It will be noted that the reinforcing titanium strips provide additional reinforcement supplementary to that provided by reinforcing fibers within a polymeric matrix of the thermoset composite material. Further, the thermoset composite material may include other forms of reinforcement such as particulate reinforcement without departing from the scope of the present disclosure.

At 402, method 400 includes positioning the plurality of reinforcing strips (made of titanium) in desired locations within the engine block mold. A first portion of the plurality of titanium reinforcing strips may be placed along a substantially transverse direction of the engine block mold at 404. As such, the transverse direction (and longitudinal and vertical directions) of the engine block mold may be the same as that (or those) of the engine block. In other words, the first portion of the plurality of titanium reinforcing strips may be arranged in locations that are substantially parallel to the transverse direction of the engine block. As described earlier in reference to FIG. 3, specific locations e.g. ribs, rails, etc. that run along the transverse direction of the engine block may be chosen. Accordingly, the titanium reinforcing strips may be arranged along pathways exposed to higher loads, forces, and stresses during engine operation.

Next at 406, a second portion of the plurality of titanium reinforcing strips may be arranged in a substantially longitudinal direction of the engine block. In other words, the second portion of the plurality of titanium reinforcing strips may be arranged in locations that are substantially parallel to the longitudinal direction of the engine block.

At 408, a third portion of the plurality of titanium reinforcing strips may be arranged in a substantially vertical direction of the engine block. In other words, the third portion of the plurality of titanium reinforcing strips may be arranged in locations that are substantially parallel to the vertical direction of the engine block (or engine block mold). Next at 410, a fourth portion of the plurality of titanium reinforcing strips may be arranged in a non-transverse, non-longitudinal and non-vertical direction of the engine block. In other words, the fourth portion of the plurality of titanium reinforcing strips (e.g. remaining) may be arranged in locations that are not parallel to the longitudinal direction, not parallel to the transverse direction, and not parallel to the vertical direction of the engine block.

Next, at 412, the method includes injecting thermoset composite material into the engine block mold. As will be noted, the molding process described above is injection molding. Other suitable methods may be used to form the molded engine block of the present disclosure. At 414, the reinforcing titanium strips are encapsulated by the thermoset composite material in the mold and as the thermoset composite material cools and solidifies, the reinforcing titanium strips may be incorporated within the engine block at the specific locations. As such, the reinforcing titanium strips may be integrated within the thermoset composite material.

In this way, reinforcing strips made from a high specific strength metal such as titanium may be used to enable improved structural stability and strength. Powertrain bending forces along the rear surface of the engine block e.g. around the transmission attachment interface, the front surface, the bottom surface towards the pan rails, and along the head deck of the engine block can be significantly countered by incorporating reinforcing strips in these locations for additional stiffness. As such, static and dynamic loads along critical load pathways in the engine block during engine operation may be balanced by including reinforcing strips. The reinforcing strips provide additional stability (in addition to the thermoset composite material) while being lightweight. Further still, by using a metal with low reactivity such as titanium, galvanic reactions during molding may be reduced.

In an example representation, an engine may comprise a cylinder block reinforced by a plurality of titanium strips selectively located within the cylinder block, the plurality of titanium strips positioned in a plurality of locations in the cylinder block encapsulated by thermoset composite wherein the titanium strips are distinct from fiber fill reinforcement included within the thermoset composite.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for molding an engine block, comprising: reinforcing the engine block with a plurality of metal strips, wherein a first portion of the plurality of strips is positioned in a substantially transverse direction of the engine block, and a second portion of the plurality of strips is positioned in a substantially longitudinal direction of the engine block, the first portion including metal strips positioned in arches along curved surfaces.

2. The method of claim 1, wherein the engine block comprises a polymeric material, and wherein the strips comprise titanium.

3. The method of claim 2, wherein the polymeric material includes a thermoset composite material comprising a matrix of thermoset resin with reinforcing fibers.

4. The method of claim 1, wherein each of the plurality of metal strips includes a strip with uniform width and thickness, with a plurality of holes distributed along a center line of the strip, and a plurality of semi-circular cutouts along each edge of the strip.

5. The method of claim 1, wherein the first portion of the plurality of metal strips includes metal strips positioned along one or more of a transverse edge of a head deck of the engine block and wherein the metal strips positioned in the arches are arched along a curved, transverse surface of a transmission attachment interface.

6. The method of claim 1, wherein a first number of the first portion of the plurality of metal strips substantially spans the engine block along the transverse direction of the engine block from a first side surface to a second side surface of the engine block.

7. The method of claim 1, wherein at least a second number of the second portion of the plurality of metal strips substantially spans an entirety of the longitudinal direction of the engine block from a front surface of the engine block to a rear surface of the engine block.

8. The method of claim 7, wherein the second number of the second portion of the plurality of metal strips includes metal strips positioned along one or more pan rails towards a bottom side of the engine block.

9. The method of claim 1, wherein a third portion of the plurality of metal strips is positioned in a substantially vertical direction of the engine block.

10. The method of claim 9, wherein the third portion of the plurality of metal strips includes metal strips positioned along one or more coolant passages, head bolt columns, and ribs positioned in the substantially vertical direction of the engine block.

11. The method of claim 9, wherein at least a third number of the third portion of the plurality of metal strips substantially spans an entirety of the vertical direction from a bottom surface of the engine block to a top surface of the engine block.

12. The method of claim 1, wherein a fourth portion of the plurality of metal strips is positioned in a radial direction relative to the curved surfaces in a non-transverse, non-longitudinal, and non-vertical direction in the engine block.

13. An engine, comprising:
a thermoset composite cylinder block reinforced by a plurality of titanium strips distributed within the cylinder block with a first portion of the plurality of titanium strips positioned in a transverse direction of the cylinder block, and wherein at least a first number of the first portion of the plurality of titanium strips substantially traverses a width of the cylinder block along the transverse direction from a first side surface to a second side surface.

14. The engine of claim 13, wherein a second portion of the plurality of titanium strips is positioned in a longitudinal direction of the cylinder block, and wherein at least a second number of the second portion of the plurality of titanium strips substantially spans a length of the cylinder block along the longitudinal direction from a front surface of the cylinder block to a rear surface of the cylinder block.

15. The engine of claim 14, wherein a third portion of the plurality of titanium strips is positioned in a vertical direction of the cylinder block, and wherein at least a third number of the third portion of the plurality of titanium strips substantially spans a height of the cylinder block along the vertical direction from a bottom surface of the cylinder block to a top surface of the cylinder block.

16. The engine of claim 15, wherein a fourth portion of the plurality of titanium strips is positioned in a non-transverse, non-longitudinal, and non-vertical direction of the cylinder block, wherein at least a fourth number of the fourth portion of the plurality of titanium strips is positioned in arches along a curved surface.

17. A molded cylinder block assembly comprising:
a thermoset composite cylinder block including a transmission attachment interface; and
a plurality of titanium strips distributed within the cylinder block in a range of angles, a first portion of the plurality of titanium strips incorporated in a substantially transverse direction of the cylinder block, a second portion of the plurality of titanium strips incorporated in a substantially longitudinal direction of the cylinder block, and a third portion of the plurality of titanium strips incorporated in a substantially vertical direction of the cylinder block.

18. The molded cylinder block assembly of claim 17, further comprising a fourth portion of the plurality of titanium strips incorporated in a substantially distinct direction from transverse, longitudinal, or vertical directions of the cylinder block.

\* \* \* \* \*